(12) United States Patent
Wilson et al.

(10) Patent No.: US 6,536,246 B2
(45) Date of Patent: Mar. 25, 2003

(54) RETAINING DEVICE FOR PERSONAL VEHICLE WITH HANDLEBARS

(76) Inventors: Larry Stephen Wilson, 7380 Stoneykirk Close, Dunwoody, GA (US) 30350; Edward John Hosch, III, 7565 Mt. Vernon Rd., Dunwoody, GA (US) 30350

( * ) Notice: Subject to any disclaimer, the term of this patent is extended or adjusted under 35 U.S.C. 154(b) by 34 days.

(21) Appl. No.: 09/741,624

(22) Filed: Dec. 19, 2000

(65) Prior Publication Data

US 2002/0073750 A1 Jun. 20, 2002

(51) Int. Cl.⁷ ............................ E05B 71/00; E05B 67/38
(52) U.S. Cl. ................. 70/233; 70/56; 70/DIG. 56
(58) Field of Search ....................... 70/233, 18, 58, 70/53, 54, 55, 56, 30, 49, 38 C, DIG. 43, DIG. 56, 344; 180/287; 403/371; 248/301, 690; 280/288.4, 304.5

(56) References Cited

U.S. PATENT DOCUMENTS

| | | | | |
|---|---|---|---|---|
| 618,639 A | * | 1/1899 | Bullard | 403/370 |
| 634,505 A | * | 10/1899 | Schowalter et al. | 403/371 |
| 653,642 A | * | 7/1900 | Darling | 280/279 |
| 757,154 A | * | 4/1904 | Tate | 74/551.6 |
| 1,366,804 A | * | 1/1921 | Jackson | 137/384.2 |
| 1,991,825 A | * | 2/1935 | Strickland | 70/233 |
| 3,837,189 A | * | 9/1974 | Atkinson | 70/21 |
| 3,918,323 A | * | 11/1975 | Prager | 180/271 |
| 4,597,273 A | * | 7/1986 | Reichenberger | 70/30 |
| 4,756,171 A | * | 7/1988 | Homar | 70/18 |
| 4,970,883 A | * | 11/1990 | Johnson | 70/30 |
| 5,063,762 A | * | 11/1991 | Vandeweghe | 280/820 |
| 5,138,901 A | | 8/1992 | Dabandijan et al. | 74/551.8 |
| 5,251,464 A | | 10/1993 | Halter | 70/30 |
| 5,347,835 A | * | 9/1994 | Dewey | 70/202 |
| 5,353,663 A | | 10/1994 | Samuelson | 74/551.8 |
| 5,647,520 A | | 7/1997 | McDaid | 224/425 |
| D390,771 S | | 2/1998 | Egger | D8/333 |
| 5,802,895 A | * | 9/1998 | Osgood | 224/42.25 |
| 6,095,386 A | | 8/2000 | Kuo | 224/448 |
| D430,787 S | | 9/2000 | Liu | D8/333 |

FOREIGN PATENT DOCUMENTS

| | | | |
|---|---|---|---|
| WO | WO 92/02400 | * | 2/1992 |
| WO | WO 92/10392 | * | 6/1992 |

* cited by examiner

*Primary Examiner*—Anthony Knight
*Assistant Examiner*—Michael J. Kyle
(74) *Attorney, Agent, or Firm*—Baker, Donelson, Bearman & Caldwell

(57) ABSTRACT

The retaining device is designed to be fitted into the end of the handlebar of a personal vehicle such as a bicycle, a motorcycle, an all terrain vehicle, or a personal watercraft. The device has a shackle, a cable, or a spring loaded lever which extends out of the distal end of the handlebar whereby it can be used to retain such items as a motorcycle helmet or a flotation vest. The retaining device can optionally include a lock, which can be either a combination lock or a keyed lock. Advantageously, the retaining device is substantially fitted wholly within the handlebar of the vehicle when it is not being used. In various embodiments a cable can be used, and a cap, which is adapted to fit over said retaining device, can be attached to the distal end of the cable.

3 Claims, 5 Drawing Sheets

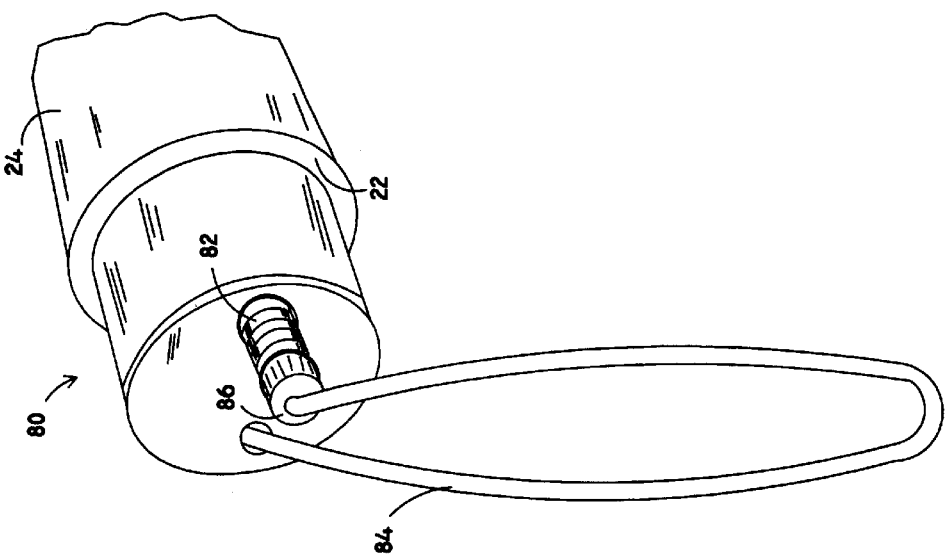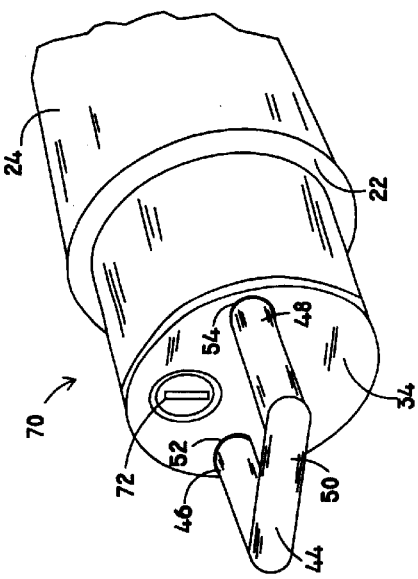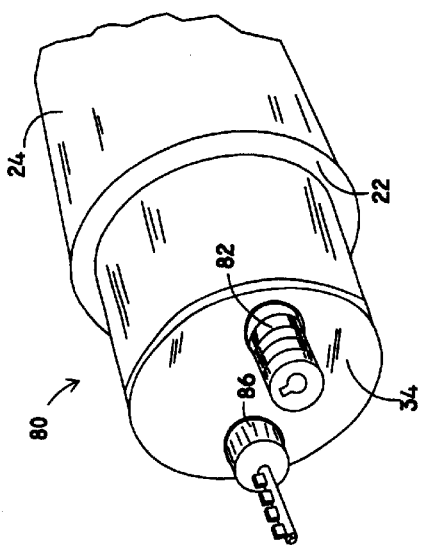

RETAINING DEVICE FOR PERSONAL VEHICLE WITH HANDLEBARS

BACKGROUND OF THE INVENTION

The present invention relates to a device for retaining items to a handlebar of a personal vehicle, or, alternatively, for retaining a handlebar to some other item. In particular, the invention relates to a device which is particularly suitable for holding a motorcycle helmet to the handlebar of a motorcycle, or, alternatively, for "locking" a motorcycle to a fixed item, to prevent it from being moved. The invention can also be used with other personal vehicles which use handlebars. Accordingly, it may be used with bicycles, all terrain vehicles, snowmobiles, and personal watercraft.

Many types of personal vehicles, including bicycles, motorcycles, all terrain vehicles, snowmobiles, and personal watercraft have handlebars which are used for steering. As is well known, most handlebars are formed of a tubular metal member, the ends of which typically have some form of "grip" affixed to them. Typical handlebar grips are made of a relatively resilient material, such as rubber or plastic, they are typically formed to be substantially cylindrical, and they are typically substantially closed at their distal ends.

Well known problems with such personal vehicles include the fact that they are prone to theft due to their relatively small size and relatively light weight, and they are not typically equipped with lockable storage space for such items as are typically used with them, including helmets, in the case of bicycles, all terrain vehicles, and snowmobiles, and flotation vests, in the case of personal watercraft.

In view of the foregoing problems, it is not uncommon for bicycle and motorcycle riders to carry with them some form of chain or cable, along with padlocks. Alternatively they often carry so-called "bicycle locks", which generally have a tubular locking device attached to a cable. In fact, the prior art shows numerous types of motorcycle and bicycle locks, which range in design from the basic padlock having an elongated U-shaped shackle, of which U.S. Pat. No. Des. -430,787 entitled MOTORCYLE AND BICYCLE LOCK, which issued on Sep. 12, 2000 to T. K. Liu, illustrates an ornamental, but typical, design.

Problems with these elongated padlocks, is that they, too, need to be stored and carried when the vehicle is in use. Accordingly, a variety of brackets have been devised simply to carry the locks. By way of example, U.S. Pat. No. 6,095,386 entitled BICYCLE LOCK MOUNTING BRACKET which issued on Aug. 1, 2000 to L. Kuo illustrates one such mounting bracket which attaches to the frame of a bicycle, and which is used to carry a bicycle lock. Another form of bicycle lock bracket is illustrated in U.S. Pat. No. 5,647,520 entitled BICYCLE LOCK BRACKET WITH SPLINES which issued on Jul. 15, 1997 to C. McDaid.

An illustrative cable type bicycle lock is shown in U.S. Pat. No. Des. -390,771 entitled BICYCLE LOCK which issued on Feb. 17, 1998 to F. B. Egger.

Problems with the foregoing locks include the fact that they get in the way of the normal operation of a bicycle, and they are not adapted to be used on other types of personal vehicles which have handlebars. In order to get around the first of these problems, devices such as that described in U.S. Pat. No. 5,353,663 entitled COMBINATION BICYCLE LOCK/HANDLEBAR ASSEMBLY, which issued on Oct. 11, 1994 to R. N. Samuelson, have been developed which enable the use of a bicycle lock as an auxiliary handlebar. A similar device is illustrated in U.S. Pat. No. 5,138,901 entitled BICYCLE LOCK MOUNTING BRACKET which issued on Aug. 18, 1992 to A. N. Dabandjian, et al.

In U.S. Pat. No. 5,251,464, entitled BICYCLE LOCK WITH STORABLE REEL CABLE, which issued on Oct. 12, 1993 to R. Halter, a cylindrical device for retractably storing the cable of a bicycle lock is described. While this device can be used with a bicycle (provided that there is sufficient room beneath the bicycle's seat and the frame), it is not adapted for use with other personal vehicles which use handlebars.

In view of the foregoing, there exists a need for a device which can be integrated into the design of a personal vehicle which steers using handlebars, and which can be used to either hold objects, such as helmets, jackets, riding apparel, and/or flotation vests, as well as to lock the personal vehicle to a fixed object as a theft deterrent.

SUMMARY OF THE INVENTION

The present invention is a retainer device which is integrated into a tubular handlebar of a personal vehicle. The invention can be used to hold helmets, jackets, riding apparel, flotation vests, or similar items, and, in various embodiments, it can be used to lock the vehicle to a fixed object to deter theft of the vehicle.

The invention is a retainer device for a personal vehicle of the type which uses handlebars for steering. It is comprised of means for connecting the retainer device to the distal end of a handlebar of the personal vehicle. In addition, the invention includes some form of extendable means attached to the retainer device. The extendable means can be extended outward from an outer face of the retainer device, whereby an item can be affixed to the extendable means.

As explained hereinafter, the extendable means can be a lever, a shackle, or a cable, and the retainer device can include a lock, such as a combination lock or, alternatively, a keyed lock.

BRIEF DESCRIPTION OF THE DRAWING

In the drawing:

FIG. 5 illustrates a perspective end view of another embodiment of the invention in which a keyed lock is used;

FIG. 6 is a perspective end view of yet another embodiment of the invention in which a cable is used without a shackle, and in which the cable is fully retracted within the handlebar;

FIG. 7 is a perspective end view of the embodiment of the invention shown in FIG. 6 in which the cable is shown to be extended and locked;

DETAILED DESCRIPTION OF EXEMPLARY EMBODIMENTS

Figure 1:
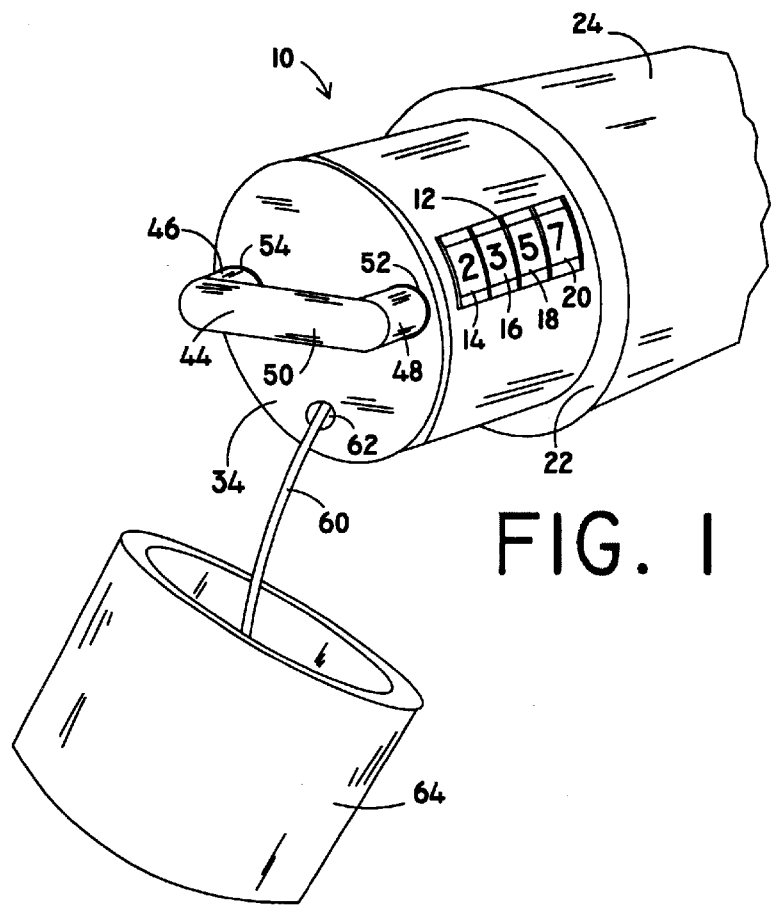
FIG. 1 is a perspective end view of the preferred embodiment of the present invention in the closed position.

Referring first to FIG. 1, a perspective side view of a first embodiment of the handlebar retaining device 10 of the present invention is shown. As shown in FIG. 1, the retaining device 10 of the preferred embodiment includes a combination lock 12. The combination lock 12 which is illustrated includes four rotating dials 14, 16, 18, 20, which be set to any desired combination, as will be explained hereinafter. As will be understood by those skilled in the art, the number of dials used in the combination lock 12, can be greater, or less, than four, although three or four are typical numbers. Alternatively, the combination lock 12 can be replaced by a keyed lock 72 for enhanced security, as shown in FIG. 5.

Figure 2:
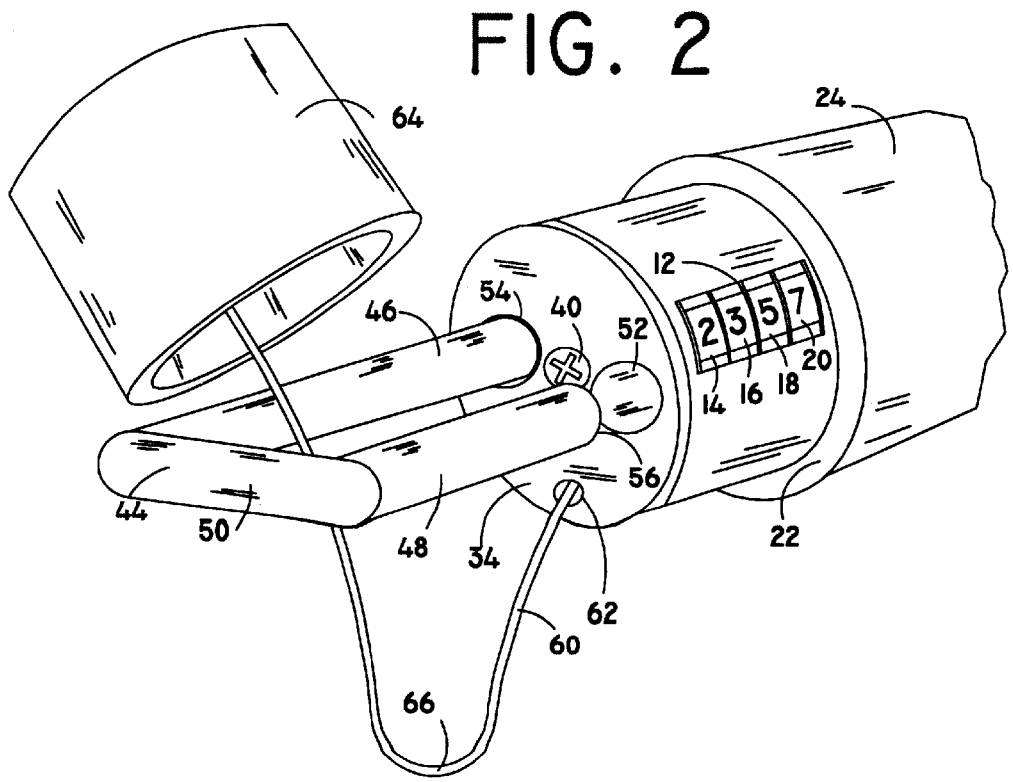
FIG. 2 is a perspective end view of the preferred embodiment of the present invention in the fully open position.
Figure 3:
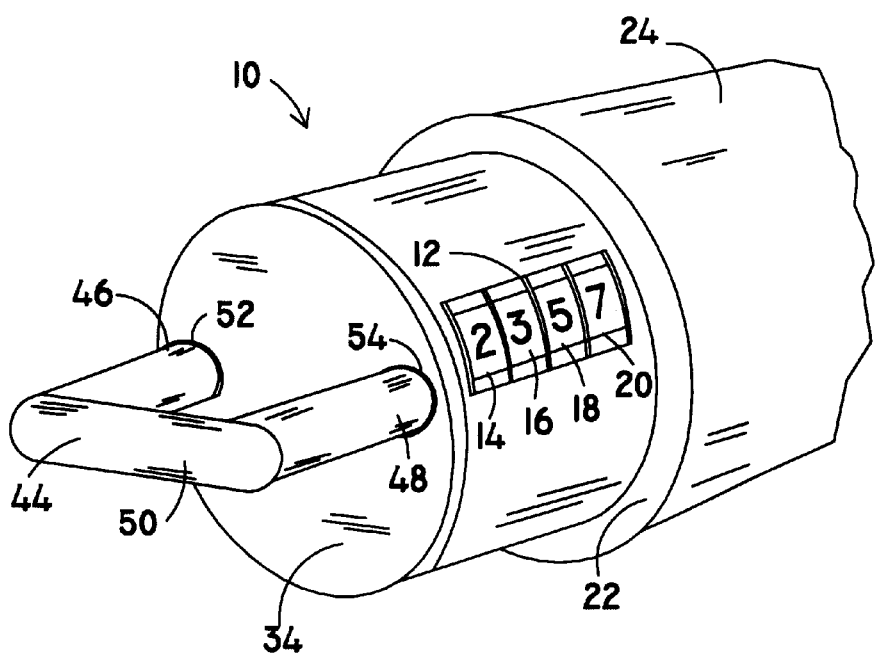
FIG. 3 is a perspective end view of the preferred embodiment of the present invention in a partially locked position.
Figure 4:
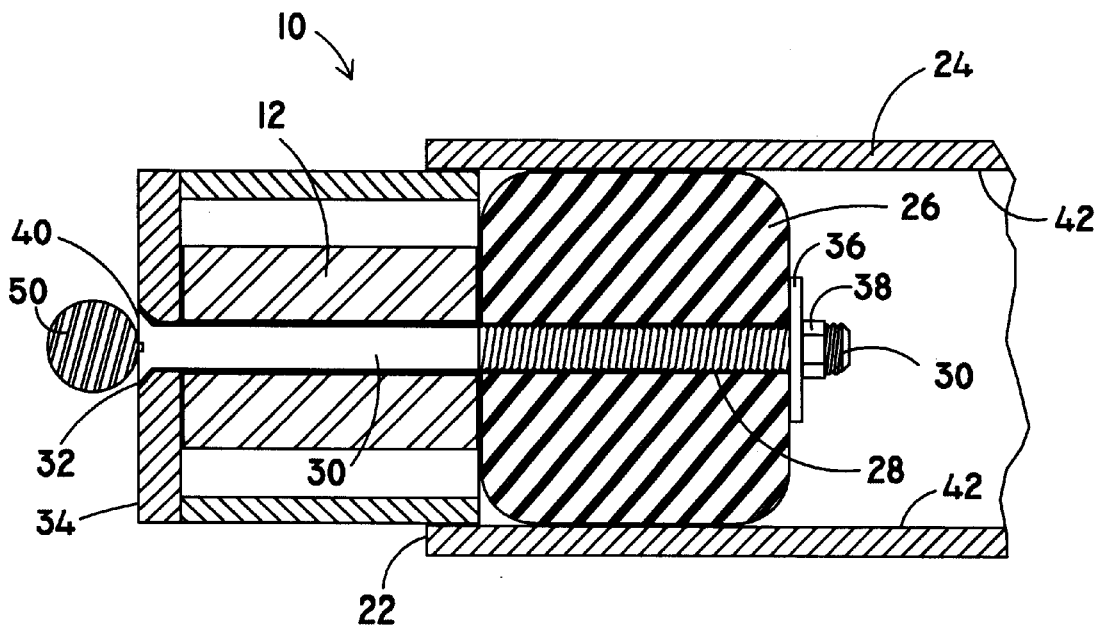
FIG. 4 is cross-sectional side view illustrating the manner in which the invention is mounted in the distal end of a handlebar.

With reference to FIGS. 1–4, the retaining device 10 is fitted to the distal end 22 of a handlebar 24 of a personal vehicle, such as a bicycle, a motorcycle, an all terrain vehicle, or a personal water craft. The handlebars of such vehicles are typically formed of hollow, substantially cylindrical members, which typically have handgrips (not shown) over their distal ends. The retaining device 10 includes an expandable hub 26 (See, FIG. 4) which fits into the opening at the distal end 22 of the handlebar 24. The expandable hub 26 can be made of a relatively hard rubber or a suitable plastic material, as will be understood by those skilled in the art, as it is known to use such expandable hubs to attach handgrips, vibration dampeners, and other items, to handlebars of personal vehicles of the type described. With particular reference to FIG. 4, the expandable hub 26 has a cylindrical hole 28 bored through its length. A screw 30, extends through an opening 32 formed through the outer face 34 of the retaining device 10. A flat washer 36 is retained on the screw 30 by a nut 38 which is threaded onto the end of the screw 30. By turning the head 40 of the screw 30, the flat washer 36 is compressed against the expandable hub 26, whereby the hub 26 expands against the inside wall 42 of the handlebar 24, thereby affixing the hub 26 in position within the handlebar 24, and thereby also affixing the rest of the retaining device 10 to the end of the handlebar 24.

With continued reference to FIGS. 1–3, the first locking embodiment 10 of the retaining device includes a shackle 44, having a fixed leg 46 and a releasable leg 48. When the shackle 44 is fully depressed, as shown in FIG. 1, the center portion 50 of the shackle 44 preferably overlays the head 40 of the screw 30, preventing access to the head 40 of the screw 30. When the combination lock 12 is unlocked, by dialing in the appropriate combination, e.g., "2357", as shown, the shackle 44 can be pulled away from the outer face 34 of the retaining device 10, until the releasable leg 48 completely exits an opening 52 formed in the outer face 34 of the retaining device 10 (See, FIG. 2), thereby leaving a space between the distal end 56 of the releasable leg 48 and the opening 52. As will be understood by those familiar with shackle locks, the portion of the fixed leg 46 which extends through opening 54 includes ratcheting means which allow the releasable leg 48 of the shackle 44 to be inserted into the opening 52, and locked down as desired. Thus, if the shackle 44 is used to retain a helmet (not shown) to a bicycle, a jacket (or other riding apparel) to a motorcycle, or a flotation vest (not shown) to a personal watercraft, the shackle 44 can be pressed into the opening 52 far enough to prevent someone from having access to the head 40 of the screw 30, in order to prevent them from simply loosening the screw 30 which would release the tension provided by the hub 26, and allow the entire retaining device 10 to be removed from the handlebar 24.

Those familiar with dial type combination locks will realize that an advantage of such locks is that their combination may be set, as desired, by a user. Typically, to set the combination, one would open the shackle 44, and then rotate it 180 degrees around the fixed leg 46, which allows the dials of the combination lock 12 to be moved, thereby changing the combination to that which the user chooses, rather than the factory preset value (typically "0000", in the case of a four-dial combination lock).

With continued reference to FIGS. 1 and 2, the retaining device 10 can optionally include a cable 60, which is preferably retractable and spring-loaded, and which extends out of an opening 62 formed in the outer face 34 of the retaining device 10. Alternatively, an end of the cable 60 could be affixed to the outer face 34 of the retaining device 10. Affixing the end of the cable 60 to the outer face 34 of the retaining device 10 is particularly beneficial in those instances in which the handlebar is not hollow, or in which it is hollow but has obstructions therein. In the event the handlebar is not hollow, the screw 30 would be threaded into a tapped opening on the distal end of the handlebar.

As shown, the cable 60 is preferably attached to the inside of a cap 64 which can be screwed or snapped onto the retaining device 10, when not in use, thereby protecting the combination lock 12 and the shackle 44 from the elements. In use, the shackle 44 is opened using the combination lock 12, and the cable 60 is extended out of the opening 62. In addition to having the cap 64 for protection, another benefit of this embodiment is that the cable 60 can be relatively long, so that it can be threaded through a jacket sleeve (not shown), for example. Then, with the jacket on one side of the shackle 44, and the cap 64 on the opposite side, the shackle 44 can be closed and locked to prevent the cap 64 from being pulled through the shackle 44, thereby securing the jacket to the retaining device 10. Alternatively, the cable 60 can be secured to, or around, a fixed object, such as a pole (for bicycles, or motorcycles), a pier (for personal water craft), or even a tree (for bicycles, motorcycles, snow mobiles, or all terrain vehicles), to deter theft of the vehicle. While either a retractable or fixed cable 60 can be used, those skilled in the art will recognize that a retractable, spring-loaded cable 60, preferably one which retracts and ratchets into the opening 62 would be most desirable.

Using this embodiment, it is also possible to lock something to the vehicle by hanging it from the loop 66 in the cable 60. By way of example, personal water craft are often used in conjunction with, and stored on, large boats. As such boats are often diesel powered, when fuel is needed for the personal water craft, it is generally driven to a "fuel dock" where gasoline is available. In addition, some fuel may be stored in a container, such as a plastic fuel container. This embodiment provides a way to secure the personal water craft to a dock using the cable 60, which can also be threaded through the handle of the fuel container while the rider goes ashore to visit a store, or have something to eat, without the rider having to leave the fuel container loose, or to have to carry it with him.

With reference to FIG. 5, another alternative embodiment 70, of the present invention is shown. In this embodiment 70, a keyed lock 72 is used to replace the combination lock 12 of the first embodiment 10.

With reference to FIGS. 6 and 7, yet another embodiment 80 of the invention is shown. In this embodiment 80, a cylindrical, dial-type combination cable lock 82 is used, along with a spring-loaded, retractable cable 84 (See, FIG. 7). The cable 84 is attached to one end 86 of the cable lock 82. The end 86 can be pulled out of the retainer device 80, as shown in FIG. 7, and it can be used to hold items, or, alternatively, to lock the vehicle to a fixed item, such as the pole of a street sign or a parking meter, as described above.

Figure 8:
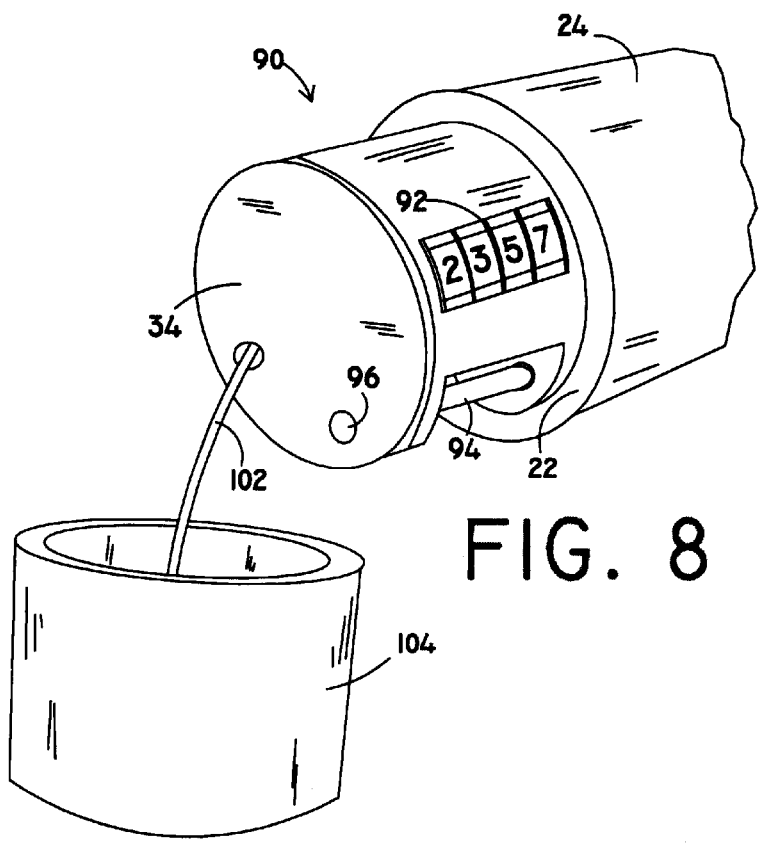
FIG. 8 is a perspective end view of still another embodiment of the invention which includes a spring-loaded bar lock.
Figure 9:
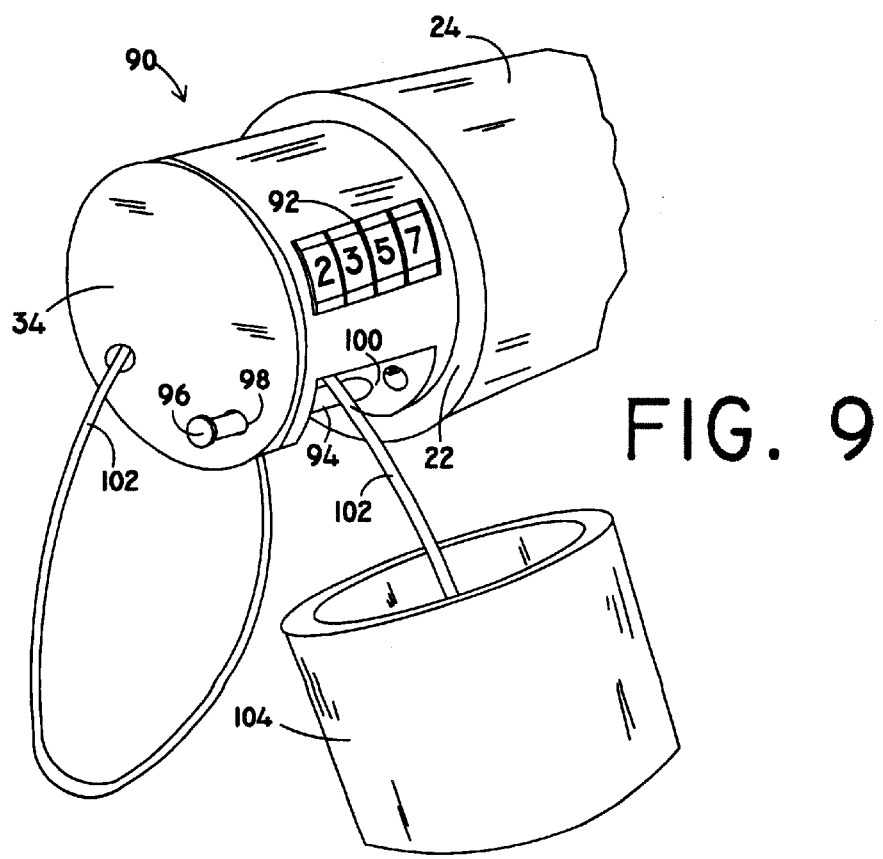
FIG. 9 is a perspective end view of the embodiment shown in FIG. 8 in which the spring-loaded bar lock is shown in its open position.

With reference to FIGS. 8 and 9, yet another embodiment 90 of the invention is shown. In this embodiment 90, a cylindrical, dial-type combination lock 92 is used, along with a spring-loaded bar 94. When the lock 92 (which could be replaced by a keyed lock) is unlocked, the end 96 of the bar 94 pops out of an opening 98 in the outer face 34 of the retainer device (See, FIG. 9) 90, leaving a space 100 for threading a cable 102, which is attached to a cap 104. To lock this embodiment, the end 96 of the bar 94 is pushed in, locking it into place, as shown in FIG. 8.

Figure 10:
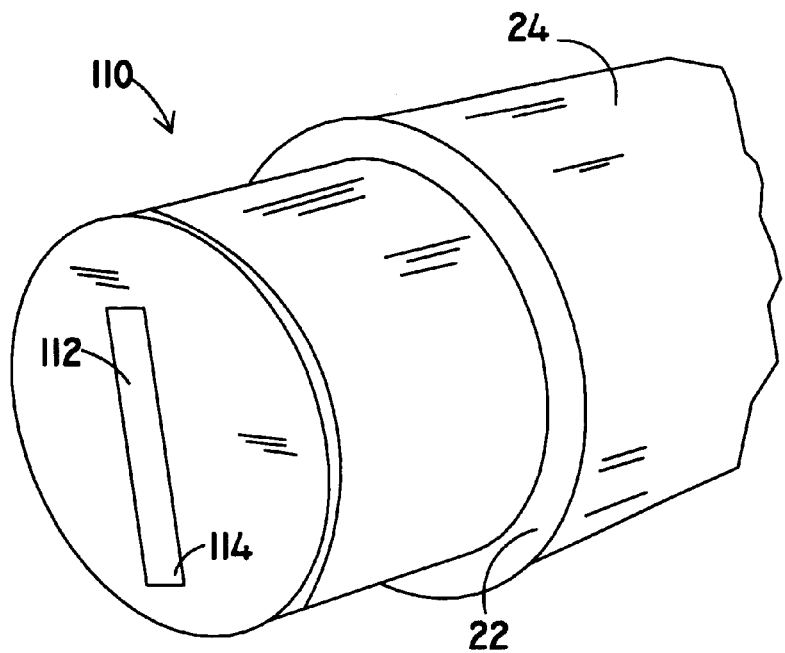
FIG. 10 is a perspective end view of the yet another embodiment of the invention which includes a spring-loaded lever.
Figure 11:
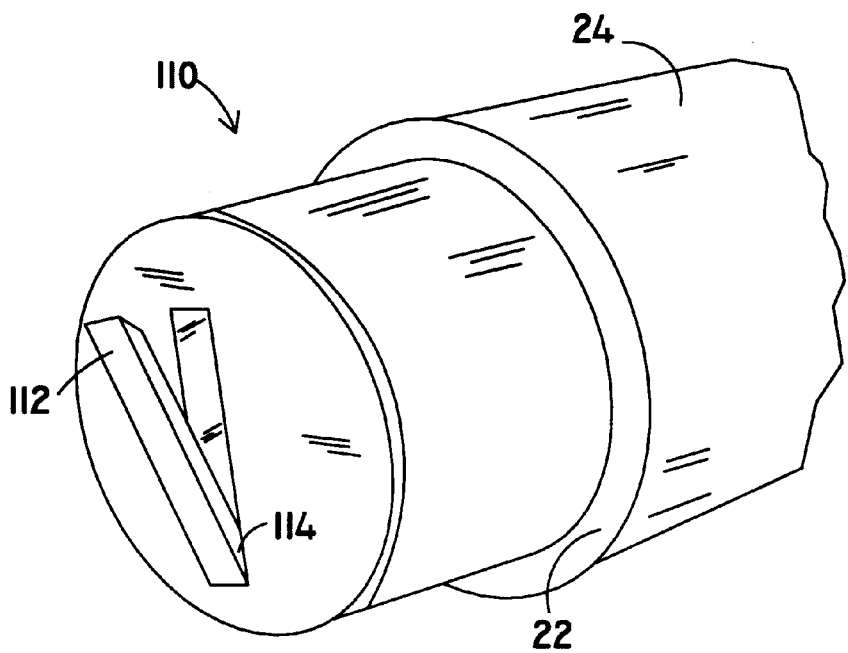
FIG. 11 is a perspective end view of the embodiment shown in FIG. 10 in which the spring loaded-lever is shown in its extended position.

Finally, while the earlier described embodiments of the retainer device of the present invention included some type of locking device, the present invention also contemplates the use of a non-locking retainer device 110, as shown in FIGS. 10 and 11, which illustrates a retainer device 110 comprised of a spring-loaded arm 112, which is hinged at its lower end 114. As shown in FIG. 10, this allows the arm 112 to be swung out forming a "V" shaped retainer hook which is particularly suitable for holding a helmet (for use with a motorcycle, bicycle, or all terrain vehicle) or a flotation vest (for use with a personal watercraft). Those skilled in the art will recognize that while motorcycle helmets are often simply hung from the handlebar of the motorcycle, some motorcycle designs preclude the use of the handlebars for holding helmets as they have rear-view mirrors integrated into their designs. Also, the brake and clutch levers (not shown) are typically sloped downward, which means that if one attempts to hang a helmet from them there is a likelihood that the helmet will slide down, and fall off.

While a number of variations of the present invention have been described, other variations will be apparent to those skilled in the art, and all such variations are intended to be included within the scope of the present invention. Thus, it is possible to use cables, as shown in FIGS. 1, 2, and 7–9 along with keyed locks, as shown in FIG. 5, without departing from the present invention. Also, if a cable is used, it may be attached to either a cap, as shown in FIGS. 1, 2, 8, and 9, or to the outer face of the retainer device, as shown in FIGS. 6 and 7. As will be obvious, numerous other variations can be made, without departing from the spirit or scope of the invention.

We claim:

1. A retainer device for a personal vehicle of the type which uses handlebars for steering, comprising:
   (a) means for connecting said retainer device to the distal end of a handlebar of said personal vehicle which comprises an expandable hub having a screw extending therethrough; and
   (b) extendable means attached to said retainer device which can be extended outward from an outer face of said retainer device and which comprises a lever which can be flipped out of said retainer device whereby an item can be affixed to said extendable means.

2. The retainer device of claim 1, wherein said lever is spring loaded, whereby it will retract into said retainer device when there is nothing holding it out of said retainer device.

3. A retainer device for a personal vehicle of the type which uses handlebars for steering, comprising:
   (a) means for connecting said retainer device to the distal end of a handlebar of said personal vehicle; and
   (b) extendable locking means attached to said retainer device, which can be selectively extended outward from an outer face of said retainer device or locked to said outer face of said retainer device;
   (c) a cable having a fixed end attached to said retainer device and a distal end attached to a cap adapted to fit over said retainer device, whereby said cable can be used to attach an item to said retainer device and said extendable means is adapted to be secured around said cable with whereby said cap will be on one side of said extendable means and said item will be on the other side of said extendable means.

\* \* \* \* \*